United States Patent
Tian et al.

(10) Patent No.: US 9,094,856 B1
(45) Date of Patent: Jul. 28, 2015

(54) ROUTING METHOD FOR SATELLITE COMMUNICATION NETWORK

(71) Applicant: Intelligent Fusion Technology, Inc, Germantown, MD (US)

(72) Inventors: Xin Tian, Germantown, MD (US); Genshe Chen, Germantown, MD (US); Dan Shen, Germantown, MD (US); Khanh D. Pham, Kirtland AFB, NM (US); Erik Blasch, Rome, NY (US)

(73) Assignee: Intelligent Fusion Technology, Inc., Germantown, MD (US)

( * ) Notice: Subject to any disclaimer, the term of this patent is extended or adjusted under 35 U.S.C. 154(b) by 53 days.

(21) Appl. No.: 14/188,697

(22) Filed: Feb. 25, 2014

(51) Int. Cl.
*H04B 7/185* (2006.01)
*H04W 28/02* (2009.01)

(52) U.S. Cl.
CPC ....... *H04W 28/0289* (2013.01); *H04B 7/18513* (2013.01)

(58) Field of Classification Search
USPC .......................................................... 370/238
See application file for complete search history.

(56) References Cited

U.S. PATENT DOCUMENTS

| | | | | |
|---|---|---|---|---|
| 5,602,838 | A | * | 2/1997 | Kartalopoulos ............... 370/406 |
| 6,560,450 | B1 | * | 5/2003 | Rosenberg et al. ........... 455/316 |
| 8,780,928 | B2 | * | 7/2014 | Natarajan et al. ............. 370/400 |

* cited by examiner

*Primary Examiner* — Thai Nguyen

(57) ABSTRACT

Routing methods are provided for IP-based Iridium like LEO polar satellite constellation network for finding a Manhattan path between a source node and a destination node. The routing methods can include identification of congested inter satellite links (ISLs). By selecting and using uncongested alternative paths, an original routing process can be converted into sub-routing processes each in a small scale of a Manhattan path region. Quality of Service (QoS) requirements such as delays and jitters can be incorporated into the routing methods, which leads to efficient routing and enhanced QoS-performance over the satellite constellation network. The disclosed routing methods can be suitable for real-time routing/rerouting applications under dynamic network conditions.

17 Claims, 8 Drawing Sheets

ROUTING METHOD FOR SATELLITE COMMUNICATION NETWORK

GOVERNMENT RIGHTS

This invention was made with Government support under Contract No. FA9453-12-M-0084 awarded by the United States Air Force. The U.S. Government has certain rights in the invention.

FIELD OF THE DISCLOSURE

The present disclosure relates to the field of IP-based communication networks over low earth orbit (LEO) polar satellite constellations and, more particularly, relates to a routing method between any two satellite nodes within the constellation for delivery of data packets.

BACKGROUND

Compared with geosynchronous earth orbit (GEO) based satellite communication networks, satellite communication networks at a low earth orbit (LEO) orbit have much smaller propagation delays. And due to much reduced communication distances to earth, LEO communication systems have low power requirements on ground terminals, which may allow broadband communication services to be used on small size mobile terminals. However, a constellation of LEO satellites is needed to provide global coverage due to reduced coverage areas (footprints) of each LEO satellite. Satellites in the LEO constellation are moving with respect to each other and its network users, which may lead to a dynamic network. As a result, highly efficient routing methods are needed for real-time evaluation and for update of routing paths for the delivery of data packages in an IP-based LEO satellite network.

Although topology of the LEO satellite network is time-varying, the topology is known and predictable. This makes the link state based routing approach, where every node constructs a map of network connectivity based on the states of the communication links, more desirable over the distance vector approach, which works by having neighboring nodes share their routing tables. Dijkstra's algorithm is the foundation of most link state based routing protocols and is able to effectively calculate the shortest path between any two nodes in a network of an arbitrary topology. However, as a general shortest path algorithm, Dijkstra's algorithm does not exploit the topology features of a LEO constellation. In addition, complexity of the Dijkstra's algorithm is still too high for the routing needs in IP-based LEO satellite networks.

BRIEF SUMMARY OF THE DISCLOSURE

One aspect or embodiment of the present disclosure includes a method for a network traffic routing in an LEO polar satellite constellations. A Manhattan path can be found based on a shortest path or a robustness criterion from a source node to a destination node by considering that all inter satellite links (ISLs) from the source node to the destination node are uncongested. The source node corresponds to a source satellite and the destination node corresponds to a destination satellite. It can be examined whether the Manhattan path is congested, by determining whether the Manhattan path contains a congested ISL. All congested ISLs along the Manhattan path from the source node to the destination node can be identified, when that Manhattan path contains at least one congested ISL is determined.

A first congested ISL that has a fewest uncongested alternative ISLs among all of the congested ISLs can be identified. For the first congested ISL, a candidate list of uncongested alternative ISLs can be formed. Again, based on the shortest path or robustness criterion, a best uncongested alternative ISL can be selected from the candidate list. The selected uncongested alternative ISL has a starting node and an ending node. The selected uncongested alternative ISL can then be removed from the candidate list. A first sub-routing process can be used to route from the source node to the starting node of the selected uncongested alternative ISL. A second sub-routing process can be used to route from the ending node of the selected uncongested alternative ISL to the destination node.

Other aspects or embodiments of the present disclosure can be understood by those skilled in the art in light of the description, the claims, and the drawings of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Advanced routing methods in an IP based LEO satellite constellation network need to consider quality of service (QoS) requirements of data traffics from various applications on delay, jitter, etc. It is also important that the routing methods are able to effectively distribute data traffic across the LEO satellite constellation network by exploiting multiple paths between source and destination nodes. Accordingly, for IP based LEO satellite constellation networks, it is desirable to provide enhanced efficiency to meet the real-time routing requirements to facilitate the incorporation of traffic QoS requirements and effective traffic distribution in dynamic network traffic conditions.

Disclosed herein include routing methods for IP based satellite communication network over Iridium like LEO polar constellations. For example, Manhattan paths (e.g., including only vertical and horizontal paths) for network traffic routing can be found in the Iridium like LEO polar satellite constellation network. In addition, effective routing methods can incorporate traffic QoS requirements on communication delay and can reduce jitter in network traffic in time of inter-satellite link (ISL) congestion, where packet rerouting is then required.

Exemplary Iridium-like LEO polar constellation network can include satellites in multiple (e.g., with a number of N, wherein N is an integer such as 6 in the Iridium constellation network) evenly spaced orbital planes of high inclination. Within each orbital plane, inter-satellite links (ISLs) are permanently established between neighboring satellites. Inter-plane ISLs are established between satellites at neighboring orbit planes with, for example, a "W" inter-plane link pattern. However, inter-plane ISLs need to be turn off at high latitude, e.g., above 70°, due to excessive relative angular velocity between satellites on neighboring orbital planes close to the Polar regions (e.g., including the North Pole and/or the Source Pole). In addition, no inter-plane ISLs are established between the first and the last orbital planes at the "seam" of the satellite network, where neighboring satellites on the two planes move in opposite directions.

Figure 1:
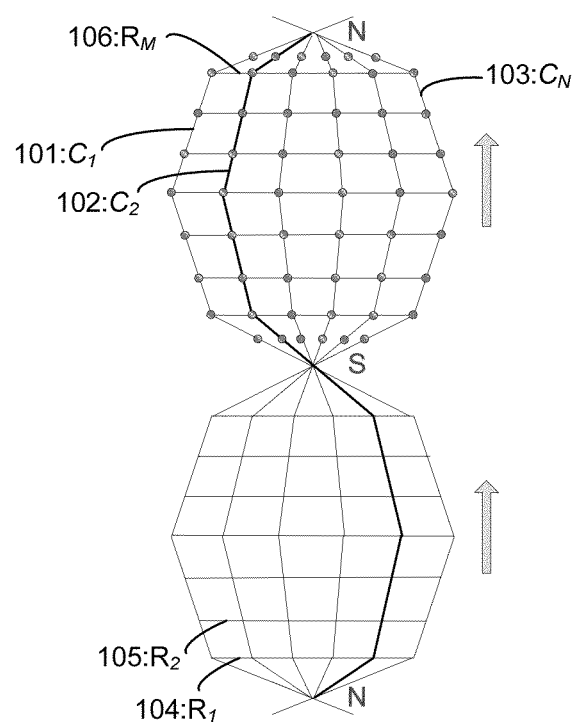
FIG. 1 depicts a topology of an LEO satellite constellation network consistent with various disclosed embodiments.

FIG. 1 shows a topology of an LEO satellite constellation network (or network) consistent with various disclosed embodiments. As shown, the topology of the LEO satellite constellation network includes a number of N columns (e.g., $C_i$ such as 101 $C_1$, 102 $C_2$, ... 103 $C_n$) with one for each orbit plane. The topology of the LEO satellite constellation network includes a number of M rows (e.g., $R_i$ such as 104 $R_1$, 105 $R_2$, ... 106 $R_m$), where inter-plane ISLs are established along each row. Due to presence of the "seam" between the first and the last orbital planes, the network is divided into two sides by the Polar Regions including, e.g., the North Polar region and the South Polar region. As such, on one side of the network, satellites move from the South (S) Pole towards the North (N) Pole; while on the other side of the network, satellites move from the North (N) Pole towards the South (S) Pole. For illustration purposes as shown in FIG. 1, the first row with satellites leaving the North Pole shown in FIG. 1 is denoted as $R_1$ and the front row that is moving towards the North Pole shown in FIG. 1 is denoted as $R_m$.

As disclosed herein, desired uncongested routes can be found among Manhattan paths between any two satellite nodes in the satellite constellation network. The desired uncongested routes can be paths that contain the same and minimum number of satellite nodes.

Figure 2A:
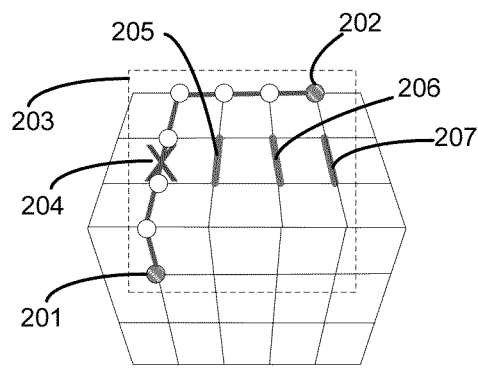
FIGS. 2A-2C depict an exemplary routing method consistent with various disclosed embodiments.
Figure 2B:
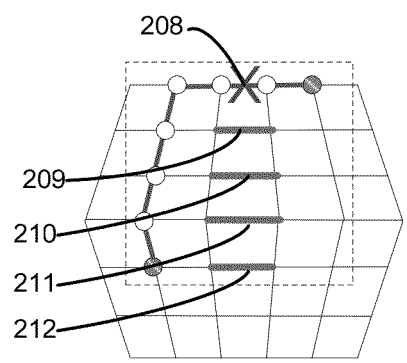
Figure 2C:
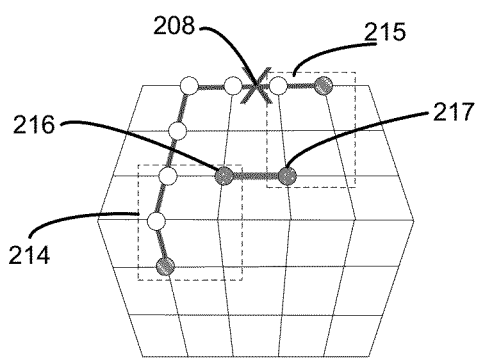

FIGS. 2A-2C depict an exemplary routing method consistent with the disclosed embodiments. Note that although the exemplary routing method depicted in FIGS. 2A-2C include a routing method from a source node to a destination node that are on a same side of the LEO polar satellite constellation network, the disclosed routing method can also be used to provide a route from a source node to a destination node that are on different sides of the LEO polar satellite constellation network.

As used herein, a Manhattan path region refers to a region that contains all possible Manhattan paths from a source node to a destination node. Alternative ISLs of an ISL can be defined in the Manhattan path region depending on whether the ISL is an inter-plane ISL or an intra-plane ISL.

For example, when an ISL (e.g., a congested ISL) is an inter-plane ISL, alternative ISLs (e.g., uncongested alternative ISLs) can include all ISLs corresponding to the ISL (e.g., the congested ISL) in a lateral direction in the Manhattan path region. In another example, when an ISL (e.g., a congested ISL) is an intra-plane ISL, alternative ISLs (e.g., uncongested alternative ISLs) can include all ISLs corresponding to the ISL (e.g., the congested ISL) in a longitude direction in the Manhattan path region.

As shown, FIG. 2A includes a source node 201, a destination (or exit) node 202, and a Manhattan path region 203 containing all possible Manhattan paths for connecting the source node 201 and the destination node 202. For example, the source node 201 can be at $\{R_k, C_l\}$, the destination node 202 can be at $\{R_m, C_n\}$, and the Manhattan path region 203 can be the region circumvented by $R_k$, $C_l$, $R_m$, and $C_n$.

Within the Manhattan path region 203 in FIG. 2A, alternative intra-plane ISLs between the same two neighboring rows include a set of alternative ISLs 204, 205, 206, and 207, in the sense that a Manhattan path can path one and only one (e.g., intra-plane ISL 204) of the ISLs. Similarly, as illustrated in FIG. 2B, in the Manhattan path region 203, alternative inter-plane ISLs between the same two columns form a set of alternative ISLs 209, 210, 211, and 212.

When an ISL in a route from the source node 201 to the destination node 202 is congested, e.g., as indicated by "X" for ISL 204 and ISL 208 in FIGS. 2A and 2B respectively, uncongested alternative ISL(s) can be used for routing or re-routing. For example, as shown in FIG. 2C, a congested inter-plane ISL 208 can have an uncongested alterative inter-plane ISL with a starting node 216 and an ending node 217. Then the original routing within the Manhattan path region 203 can be converted into two sub-routing within two Manhattan path regions 214 and 215 each smaller than the original Manhattan path region 203.

That is, the routing method between the source node 201 and the destination node 202 can be achieved by routing from the source node 201 to the starting node 216 of the uncongested alternative ISL (in the first Manhattan path region 214), and routing from the ending node 217 of the uncongested alternative ISL to the destination node 202 (in the second Manhattan path region 215).

Further, an uncongested Manhattan path can be obtained in a recursive fashion. For example, FIG. 3 depicts an exemplary routing method for a network traffic routing in a low earth orbit (LEO) polar satellite constellation network consistent with various disclosed embodiments.

Figure 3:
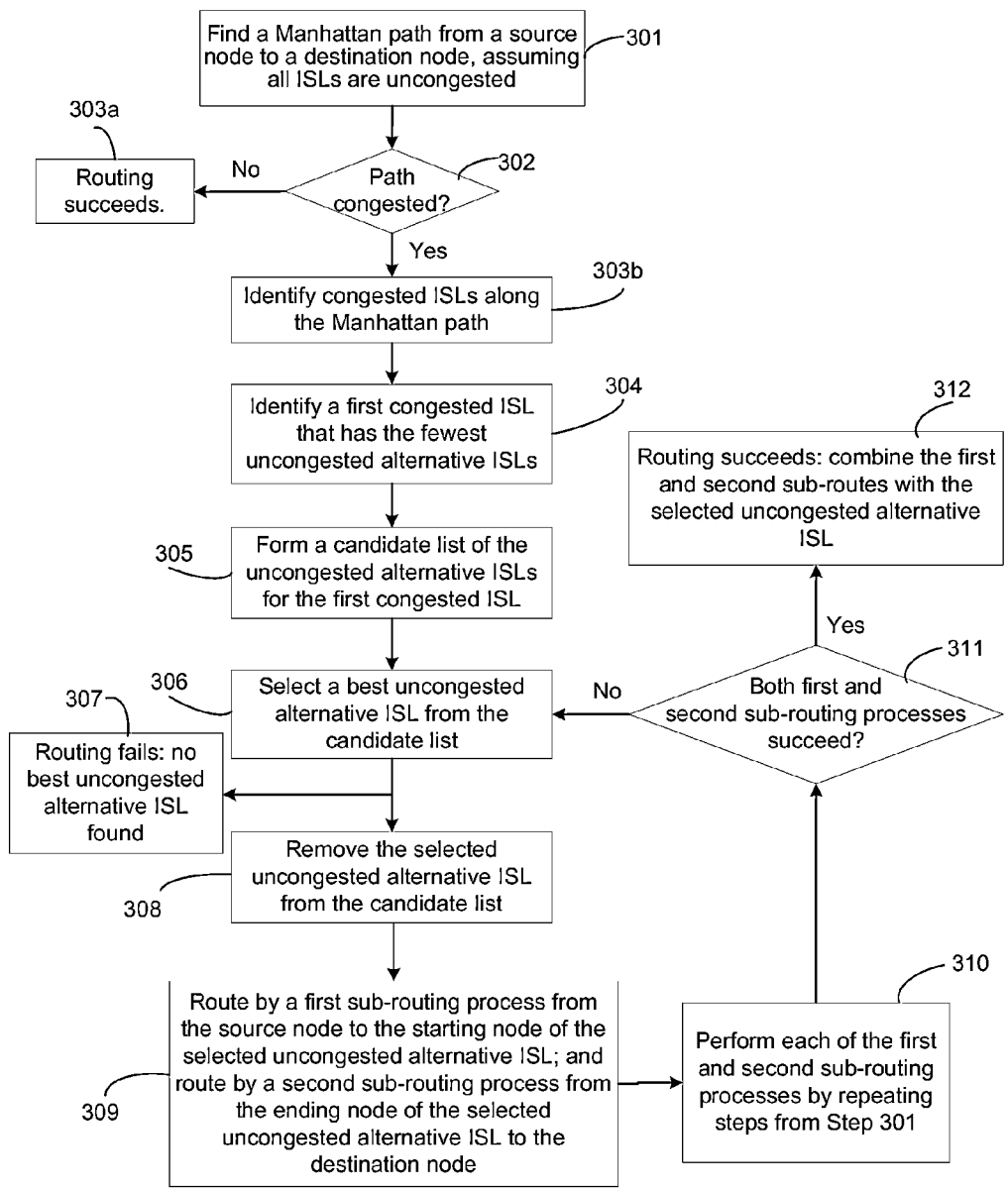
FIG. 3 depicts another exemplary routing method for a network traffic routing in LEO polar satellite constellations consistent with various disclosed embodiments.

In Step 301 of FIG. 3, a Manhattan path can be found, based on a shortest path or a robustness criterion, from a source node to a destination node by assuming/consuming that all inter-satellite links (ISLs) from the source node to the destination node are uncongested. The source node corresponds to a source satellite and the destination node corresponds to a destination satellite.

For example, a path or a route, e.g., a "most desired path/route", can be determined from the source node to the destination node, e.g., without considering ISL congestions. The "most desired path/route" between these two nodes without considering ISL congestions in the network varies with different criterions. In exemplary embodiments, best paths can be routed based on minimization of signal propagation delay and based on the criterion of routing robustness under dynamic network conditions.

In Step 302 of FIG. 3, whether the Manhattan path is congested can be examined by determining whether the Manhattan path contains a congested ISL. When the route is determined uncongested, that means the best route is found at one short and can be output in Step 303a. When the route is determined congested, e.g., when that the Manhattan path contains at least one congested ISL is determined, all congested ISLs can be identified along the Manhattan path from the source node to the destination node as depicted in Step 303b.

In Step 304 of FIG. 3, a first congested ISL that has a fewest uncongested alternative ISLs can be identified among all of the congested ISLs. In Step 305 of FIG. 3, for the first congested ISL, a candidate list of uncongested alternative ISLs can be formed.

In Step 306 of FIG. 3, based on the shortest path or robustness criterion, a best or most desirable uncongested alternative ISL can be selected from the candidate list. The selected uncongested alternative ISL can have a starting node and an ending node.

In Step 307 of FIG. 3, when there is no alternative ISL left in the candidate list, the routing method may fail and no uncongested Manhattan path can be found between the source node and the destination node.

In Step 308 of FIG. 3, when there is the most desirable alternative ISL selected, the selected uncongested alternative ISL can be removed from the candidate list.

In Step 309 of FIG. 3, the original routing process between the source node and the destination node is then converted into two sub-routing processes including, e.g., a first routing process for routing from the source node to the starting node of the selected uncongested alternative ISL, and a second routing process for routing from an ending node of the selected uncongested alternative ISL to the destination node.

In Step 310 of FIG. 3, each of the first and second routing processes can be solved or routed by recursively repeating the routing method in FIG. 3 starting from the Step 301 until the route is recursively found.

In Step 311 of FIG. 3, it can be determined whether the first sub-routing process succeeds and obtains a first sub-route that is a first Manhattan path from the source node to the starting node. It can also be determined whether the second sub-routing process succeeds and obtains a second sub-route that is a second Manhattan path from the ending node to the destination node.

In Step 312 of FIG. 3, when both the first and second sub-routing processes are successfully solved, the two sub-routes can be combined with the selected uncongested alternative ISL to generate and output a final route.

Otherwise, when none or one of the sub-routing processes is successfully solved, i.e., when one or both of the first sub-routing process and the second sub-routing process fail, the routing method can proceed to repeat from Step 306 to select another most desirable or best uncongested alternative ISL from remaining candidates in the candidate list. Following steps in the method of FIG. 3 can also be repeated until a desired route is found.

Although FIG. 3 is described as the source and destination nodes are on a same side of the network, the routing method can also be used for the case when the source and destination nodes are on different sides of the network.

For example, in the case when the source and destination nodes are on different sides of the network, as shown in FIG. 1 having a number of M rows, a source node can be at $\{R_k, C_l\}$ and a destination node can be at $\{R_m, C_n\}$. R (k, m) can denote a set of rows ranging between $R_k$ and $R_m$. $\overline{R}$ (k, m) denotes a set of rows containing $R_k$ and $R_m$ plus the rows outside R (k, m). For example, when k=3, m=7, and total number or rows M=10, then $$R(3, 7) = R(7, 3) = \{R_3, R_4, R_5, R_6, R_7\} \quad (1)$$

and $$\overline{R}(3, 7) = \overline{R}(7, 3) = \{R_3, R_2, R_1, R_{10}, R_9, R_8, R_7\} \quad (2)$$

In this case, the Manhattan path region is circumvented by $R_k$, $C_j$ $R_m$, and $C_n$, but pass across one of R (k, m) and $\overline{R}$ (k, m), whichever has the smallest span in the latitude direction.

When the source and destination nodes are on different sides of the network, the method depicted in FIG. 3 can also be used, e.g., to form a candidate list of uncongested alternative ISLs as depicted in Step 305. The uncongested alternative ISLs can include intra-plane ISLs between same two neighboring rows, and inter-plane ISLs between the same two neighboring columns within the Manhattan path region.

Figure 4A:
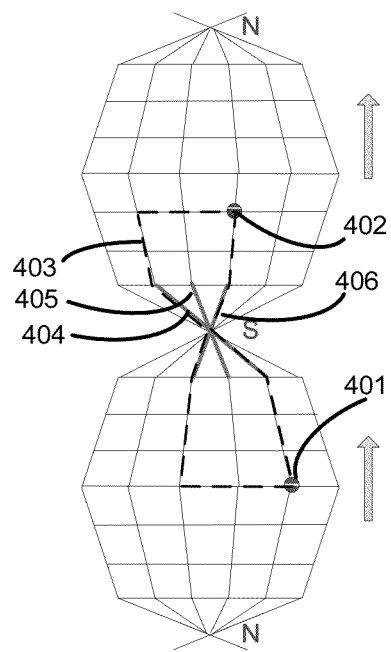
FIGS. 4A-4B depict an exemplary Manhattan path region having a source node and a destination node on different sides of a satellite constellation network consistent with various disclosed embodiments.

FIG. 4A shows an identified Manhattan path region 403 when a source node 401 and a destination node 402 are on different sides of the network. The Manhattan path region 403 can include a set of alternative intra-plane ISLs 404, 405, and 406 passing through the exemplary South (S) Pole. Each alternative intra-plane ISL can contain multiple satellite nodes.

Figure 4B:
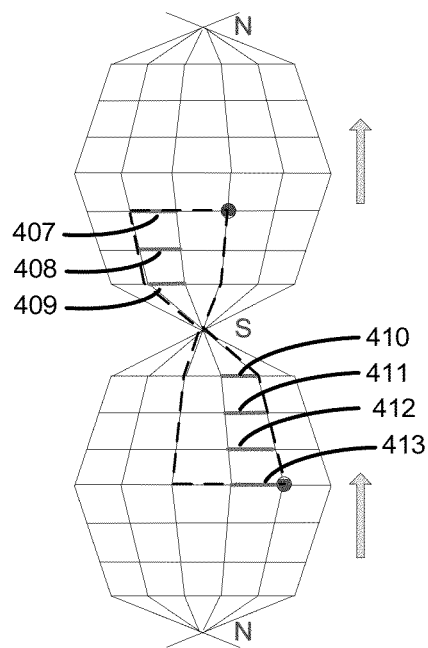

FIG. 4B shows a set of alternative inter-plane ISLs 407, 408, 409, 410, 411, 412, and 413 containing inter-plane ISLs on both sides of the network, when a source node 401 and a destination node 402 are on different sides of the network.

In various embodiments, as depicted in Steps 301 and/or 306 of FIG. 3, a Manhattan path can be found, e.g., based on a shortest path criterion from a source (or any starting) node to a destination (or any exit) node.

Figure 5A:
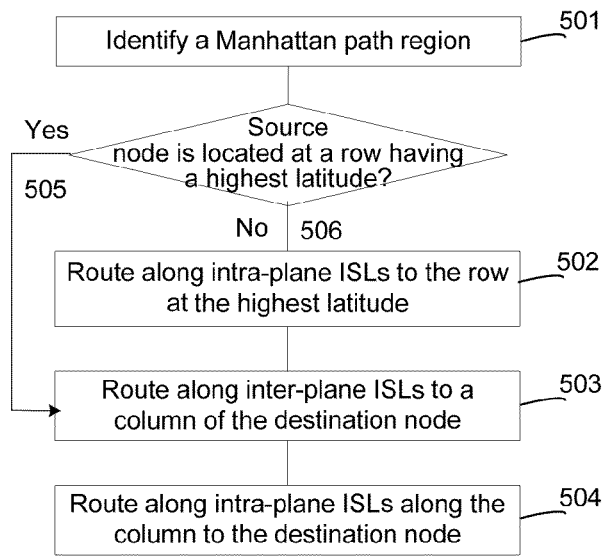
FIGS. 5A-5C depict exemplary methods for finding a Manhattan path based on a shortest path criterion consistent with various disclosed embodiments.
Figure 5B:
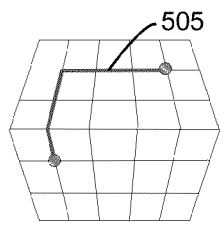
Figure 5C:
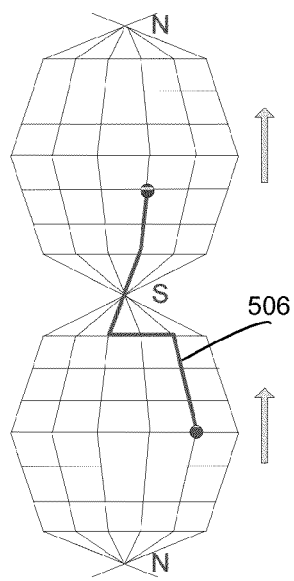

FIG. 5A depicts an exemplary method for finding a Manhattan path based on a shortest path criterion from a source node to a destination node. FIG. 5B depicts a resulting route 505 when source and destination nodes are on a same side of the network, while FIG. 5C depicts a resulting route 506 when source and destination nodes are on different sides of the network.

The method depicted herein can be based on the fact that all intra-plane ISLs in the LEO polar constellation network have practically the same length with satellites evenly space in an orbit plane. In contrast, inter-plane ISLs are much shorter at high latitudes than at low latitudes.

In Step 501 of FIG. 5A, a Manhattan path region can be identified from the source node to the destination node. It is then determined whether the source node is located at a row having a highest latitude.

The route 505 depicted in FIG. 5B can be obtained when the source node and the destination node are on a same side of the LEO polar satellite constellations, and when the source node is located at the row having the highest latitude among rows in the Manhattan path region. In this case, the routing can be performed along inter-plane ISLs in the row having the highest latitude to a column that the destination node is located as depicted in Step 503 of FIG. 5A, and then along intra-plane ISLs in the column to the destination node as depicted in Step 504 of FIG. 5A.

The route 506 depicted in FIG. 5C can be obtained when the source node and the destination node are on different sides of the LEO polar satellite constellations, and when the source node is not located at the row having the highest latitude among rows in the Manhattan path region. In this case, the routing can be performed along intra-plane ISLs to the row having the highest latitude as depicted in Step 502 of FIG. 5A, then along inter-plane ISLs at the row having the highest latitude to a column of the destination node as depicted in Step 503 of FIG. 5A, and then along intra-plane ISLs to the destination node, wherein the routing passes through Pole regions as depicted in Step 504 of FIG. 5A.

Referring back to Step 304 and/or Step 305 of FIG. 3 (i.e., when identifying the first congested ISL that has the fewest uncongested alternative ISLs among all of the congested ISLs and/or when forming the candidate list of the uncongested alternative ISLs), optionally, a search region can be identified for finding the uncongested alternative ISLs of the first congested ISL.

In an exemplary embodiment, the search region can be the Manhattan path region from the source node to the destination node, when a constraint on a signal propagation delay is not applied.

Figure 6:
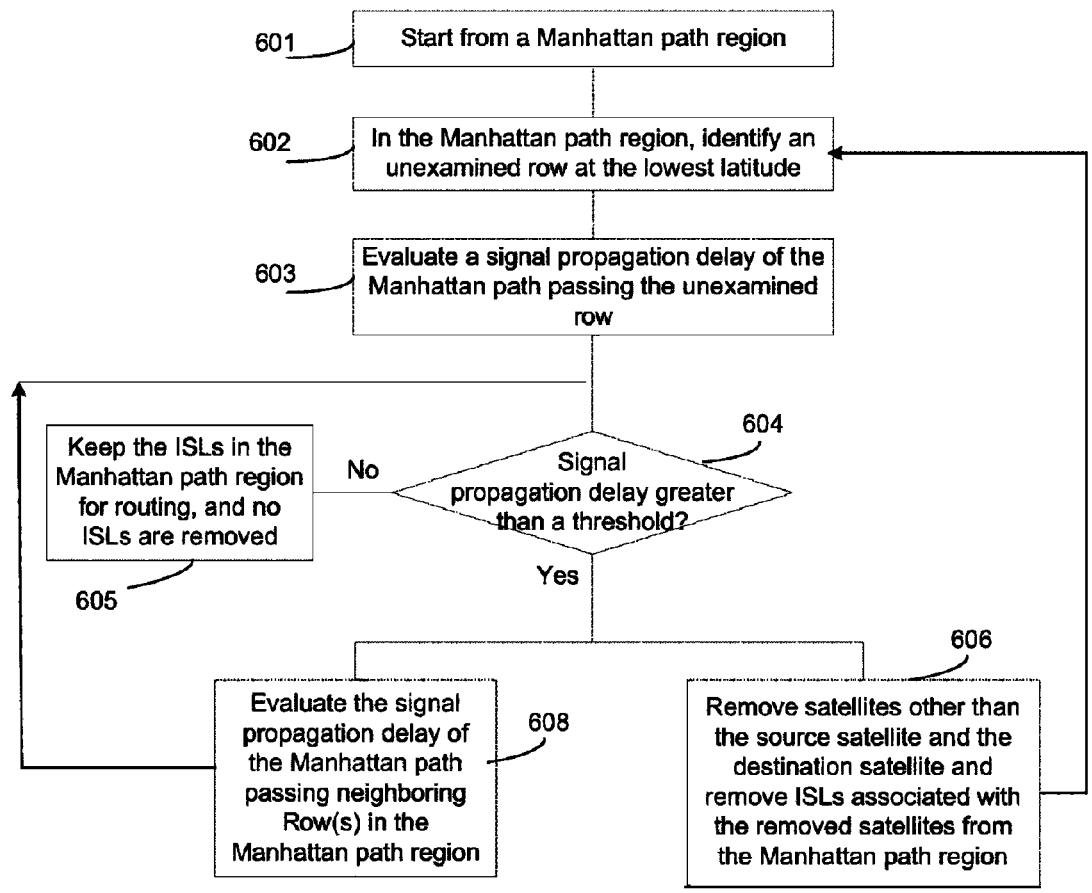
FIG. 6 depicts an exemplary method of enforcing requirements on signal propagation delay for a search region between source and destination nodes consistent with various disclosed embodiments.

In another exemplary embodiment, the search region can be identified as a region within (e.g., less than) the Manhattan path region based on a constraint on a signal propagation delay of the Manhattan path from the source node to the destination node, as shown in FIG. 6. For example, FIG. 6 depicts a method of enforcing a requirement on signal propagation delay between the source and destination nodes through the LEO polar network.

In Step 601 of FIG. 6, starting from the identified Manhattan path region, an unexamined row at the lowest latitude in the Manhattan path region can be identified, as depicted in Step 602 of FIG. 6.

In Step 603 of FIG. 6, the signal propagation delay of the Manhattan path passing the unexamined row can be evaluated. In Step 604 of FIG. 6, it can be determined whether the signal propagation delay is greater than a threshold.

In Step 605 of FIG. 6, when the signal propagation delay is determined less than the threshold, the ISLs in the Manhattan path region can be kept for routing.

However, when the signal propagation delay is determined greater than the threshold, i.e., the route does not satisfy the requirement, satellites other than the source satellite and the destination satellite can be removed and ISLs associated with the removed satellites can also be removed from the Manhattan path region as depicted in Step 606 of FIG. 6. After that, Steps from Step 602 depicted in FIG. 6 can be recursively performed.

In another case when the signal propagation delay is determined greater than the threshold, i.e., the route does not satisfy the requirement, the signal propagation delay of one or more neighboring rows in the Manhattan path region can be evaluated as depicted in Step 608 of FIG. 6, and Steps from Step 604 depicted in FIG. 6 can be repeated.

In various embodiments, as depicted in Steps 301 and/or 306 of FIG. 3, a Manhattan path can be found, e.g., based on a robustness criterion from a source (or any starting) node to a destination (or any exit) node.

Figure 7A:
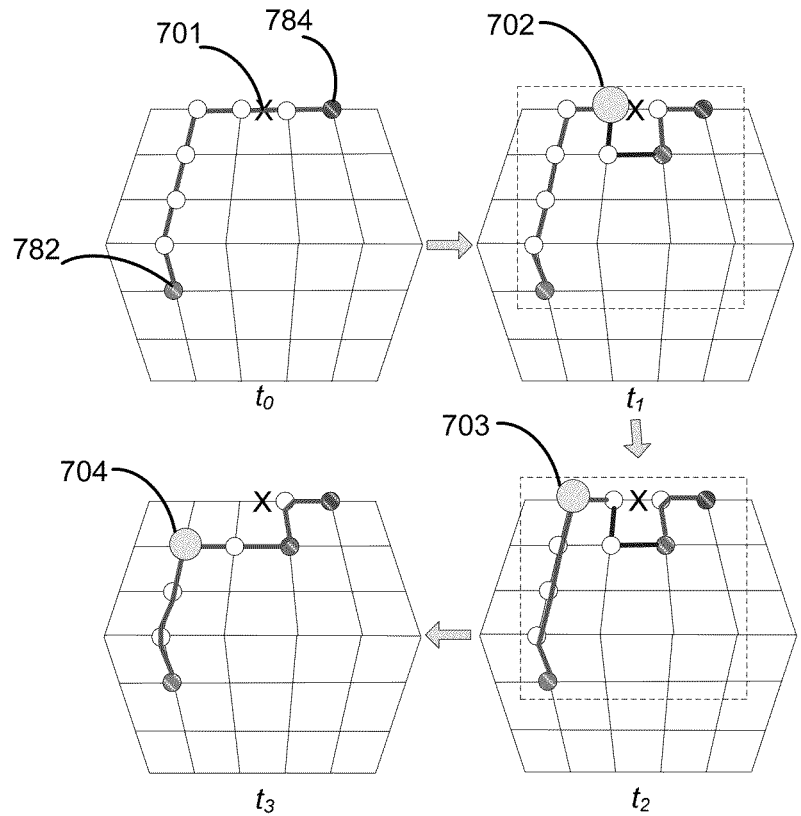
FIGS. 7A-7B compare rerouting processes resulting two different routes in response to a same congested ISL consistent with various disclosed embodiments.
Figure 7B:
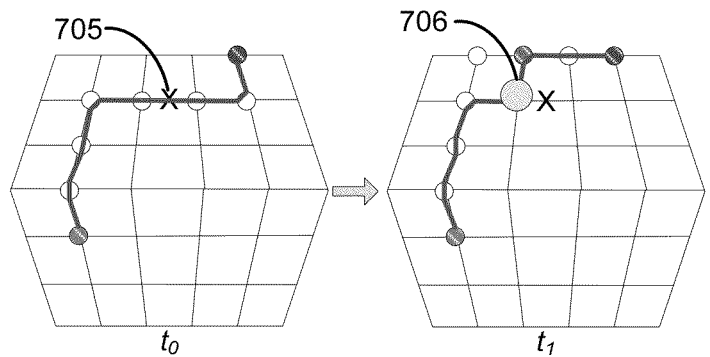

For example, due to signal propagation delays in satellite networks, in an event of, e.g., congestion of an ISL, failure of a satellite node, etc., the routing/rerouting method may take time to respond and converge to a rerouting solution. FIGS. 7A-7B compare rerouting processes resulting two different routes in response to a same congested ISL.

FIG. 7A shows the case when the original route is the shortest path from a source satellite node 782 to a destination satellite node 784. At time $t_0$, an ISL 701 along a route is congested. At time $t_1$, the congested link 701 is first detected by the satellite node 702, which re-routes the traffic through a closest alternative of the congested link 701.

At time $t_2$, information of the congested link is passed backward along the route by the satellite node 702 and can be received by an adjacent satellite node 703 located in the original route before the satellite node 702. The satellite node 703 can reroute the traffic to be merged in a direction into the original route as for a satellite node 704 located before the satellite node 703 in the original route.

At time $t_3$, the satellite node 704 reroutes the traffic with the knowledge of the congested ISL and the rerouting process converged to its final rerouting solution which is also a Manhattan path. Note that the alternative routes at time $t_1$ and $t_2$ are not Manhattan paths, which contain two additional ISLs and cause significant degradation in QoS in both latency and jitter.

In comparison, FIG. 7B shows an example when the original route is a Manhattan path but not the shortest path. At time $t_0$, an ISL 705 along a route is congested and the original route is a Manhattan path but not the shortest path. A first satellite node 706 that detects the congestion is able to reroute through another Manhattan path, which has the same number of ISLs as the original path and involves only a small change of time delay.

Figure 8A:
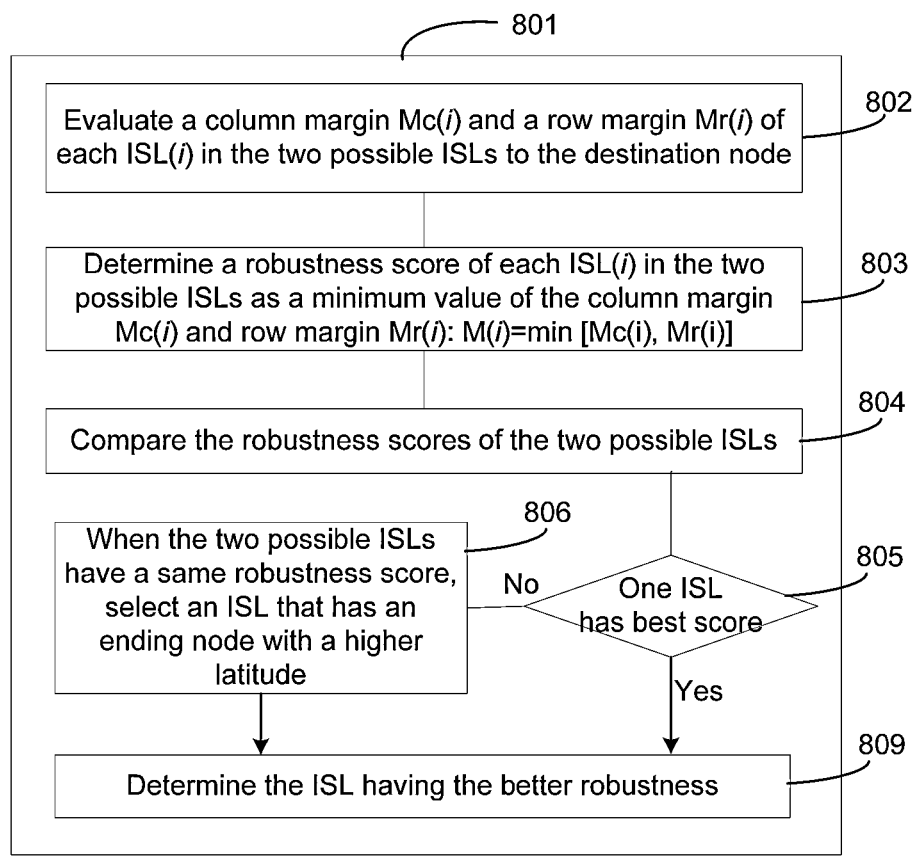
FIGS. 8A-8B depict an exemplary routing method for generating a robust route in an LEO satellite constellation network consistent with various disclosed embodiments.
Figure 8B:
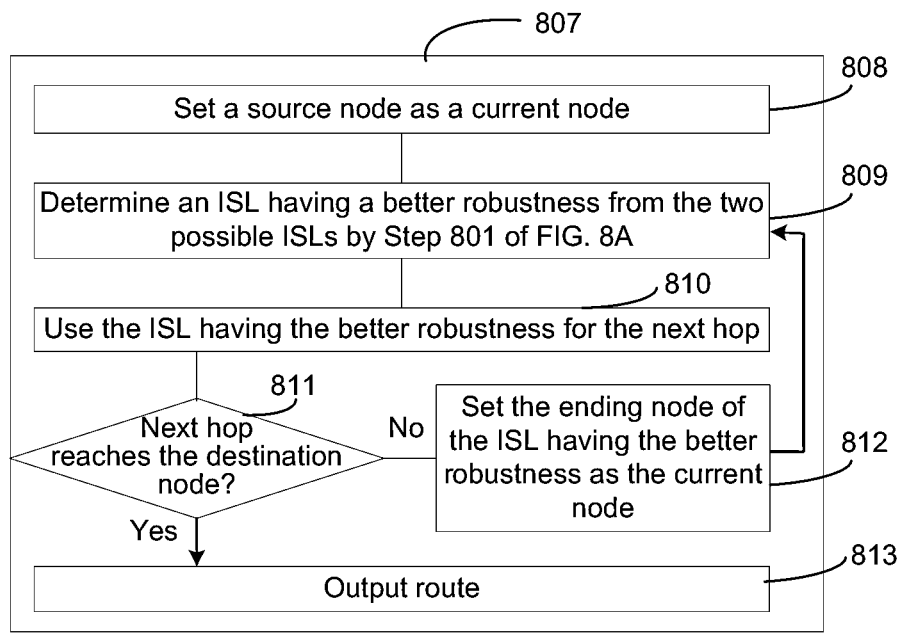

FIGS. 8A-8B depict a routing method for generating robust routes in LEO polar constellation network. Specifically, FIG. 8A provides a process 801 for ranking a set of ISLs in terms of robustness. For example, an ISL having a better robustness can be determined from two possible ISLs of a congested ISL.

In Step 802 of FIG. 8A, a column margin Mc(i) and a row margin Mr(i) of each ISL(i) (e.g., each of two possible ISLs: ISL(1) and ISL(2)) to a destination node can be evaluated. In the example discussed above, a node i may be at $\{R_k, C_l\}$ and the destination node may be at $\{R_m, C_n\}$.

The column margin of node i can be given by:

$$Mc(i) = |n - l| \qquad (3)$$

The row margin of node i can be given by:

$$Mr(i) = \min(|R(m, k)|, |\overline{R}(m, k)|) \qquad (4)$$

where $|R(m, k)|$ is the number of rows in the set $R(m, k)$, and $|\overline{R}(m, k)|$ is the number of rows in the set $\overline{R}(m, k)$.

In Step 803 of FIG. 8A, the robustness score of an ISL(i) can be determined according to:

$$M(i) = \min[Mc(i), Mr(i)] \qquad (5)$$

In Step 804 of FIG. 8A, the robust scores according to equation (5) of all of the ISLs can be compared. In Step 805 of FIG. 8A, an ISL with a best robustness score can be selected.

In Step 806, when there are multiple ISLs have a same best score, other factors or features, such as the signal propagation delay, can be used to determine a desired best score. In an exemplary embodiment, an ISL can be selected from the multiple ISLs having same best score according to the latitude of an ending node of the ISLs. For example, among the multiple ISLs having the same best score, an ISL that has an ending node with the highest latitude can be selected as the desired ISL with the best robustness score. In Step 809 of FIG. 8A, the ISL having the best robustness score can be selected.

FIG. 8B depicts an exemplary process 807 for finding a most robust route. In Step 808 of FIG. 8B, a source node can be set as a current node. The current node can further connect to the two possible ISLs for a next hop in the Manhattan path for routing to the destination node.

In Step 809 of FIG. 8B, an ISL having a better robustness from the two possible ISLs can be determined. The two ISLs in Manhattan paths can be compared to select one ISL that has the better robustness determined by the process 801 depicted in FIG. 8A.

In Step 810 of FIG. 8B, the ISL having the better robustness can be used for the next hop. The ISL having the better robustness can have an ending node.

In Step 811 of FIG. 8B, it is then determined whether the next hop reaches the destination node. When the selected next hop does not reach the destination node, the ending node of the ISL having the better robustness can be set as the current node as depicted in Step 812 and Steps from Step 808 in FIG. 8B can be repeated until the desired route is found. When it is determined that the destination node is reached, the method can then proceed to Step 813 to output the resulting route.

As such, the process depicted in FIG. 8B starts from a starting node. Two possible ISLs that leads to possible Manhattan paths for a next hop based on the starting node can be examined. According to process 801 depicted in FIG. 8A, an ISL with the best robustness score can be selected as the next hop. The process 807 can be repeated until the destination node is reached to provide the routing.

In some cases, under light traffic conditions, an optimistic search strategy can be used to directly look for the most desired (e.g., the shortest) path. Jammed links along the path, if exist, are to be identified for the routing methods. Under heavy traffic conditions with many ISLs congested, the ISL with the fewest alternative paths are first identified for the routing methods.

QoS requirements on communication delay through the LEO satellite constellation network can be effectively incorporated into the routing methods by constraining the Manhattan path region into a search region in the satellite constellation network and by evaluating probability that the delay requirement can be met.

Robust routing strategies can be used for routing in the iridium like LEO polar constellations. Instead of searching for the shortest path between the source (or entry) and destination (or exit) nodes, the robust routing strategy can be used to choose routes that allow rapid response to ISL jams or congestions and to significantly reduce jitter due to rerouting.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A method for a network traffic routing in low earth orbit (LEO) polar satellite constellations, comprising:
   a) finding a Manhattan path, based on a shortest path or a robustness criterion, from a source node to a destination node by assuming that all inter-satellite links (ISLs) from the source node to the destination node are uncongested, wherein the source node corresponds to a source satellite in the LEO polar satellite constellations and the destination node corresponds to a destination satellite in the LEO polar satellite constellations;
   b) examining whether the Manhattan path is congested by determining whether the Manhattan path contains a congested ISL;
   c) identifying all congested ISLs along the Manhattan path from the source node to the destination node, when the Manhattan path contains at least one congested ISL is determined;
   d) identifying a first congested ISL that has a fewest uncongested alternative ISLs among all of the congested ISLs;
   e) for the first congested ISL, forming a candidate list of uncongested alternative ISLs;
   f) selecting, based on the shortest path or the robustness criterion, an uncongested alternative ISL from the candidate list, wherein the selected uncongested alternative ISL has a starting node and an ending node;
   g) removing the selected uncongested alternative ISL from the candidate list;
   h) routing by a first sub-routing process from the source node to the starting node of the selected uncongested alternative ISL; and
   i) routing by a second sub-routing process from the ending node of the selected uncongested alternative ISL to the destination node.

2. The method according to claim 1, further including:
   performing the first sub-routing process from the source node to the starting node of the selected uncongested alternative ISL by repeating steps of a)-i), and
   performing the second sub-routing process from the ending node of the selected uncongested alternative ISL to the destination node by repeating steps of a)-i).

3. The method according to claim 2, further including:
   determining whether the first sub-routing process succeeds and obtains a first sub-route which is a first Manhattan path from the source node to the starting node, and
   determining whether the second sub-routing process succeeds and obtains a second sub-route which is a second Manhattan path from the ending node to the destination node.

4. The method according to claim 3, further including:
   combining the first sub-route and the second sub-route with the selected uncongested alternative ISL, when both the first sub-routing process and the second sub-routing process succeed.

5. The method according to claim 3, further including:
   repeating steps f)-i), when one or both of the first sub-routing process and the second sub-routing process fail.

6. The method according to claim 1, further including a Manhattan path region containing all possible Manhattan paths from the source node to the destination node.

7. The method according to claim 6, wherein:
   the congested ISL is an inter-plane ISL, and the uncongested alternative ISLs include ISLs corresponding to the congested ISL in a lateral direction in the Manhattan path region, and
   the congested ISL is an intra-plane ISL, and the uncongested alternative ISLs include ISLs corresponding to the congested ISL in a longitude direction in the Manhattan path region.

8. The method according to claim 6, wherein identifying the first congested ISL or forming the candidate list of uncongested alternative ISLs includes:
   identifying a search region for finding the uncongested alternative ISLs of the first congested ISL.

9. The method according to claim 8, wherein the search region is the Manhattan path region from the source node to the destination node, when a constraint on a signal propagation delay is not applied.

10. The method according to claim 8, wherein the search region is identified as a region within the Manhattan path region based on a constraint on a signal propagation delay of the Manhattan path from the source node to the destination node:
   1) identifying an unexamined row at a lowest latitude in the Manhattan path region;
   2) evaluating the signal propagation delay of the Manhattan path passing the unexamined row;
   3) determining if the signal propagation delay is greater than a threshold; and
   4) when the signal propagation delay is determined less than the threshold, keeping the ISLs in the Manhattan path region for routing; or
   5) when the signal propagation delay is determined greater than the threshold, removing satellites other than the source satellite and the destination satellite and removing ISLs associated with the removed satellites from the Manhattan path region and then repeating Steps 1)-5), or evaluating the signal propagation delay of one or more neighboring rows in the Manhattan path region by repeating Steps 3)-5).

11. The method according to claim 1, wherein the source node and the destination node are on a same side of the LEO polar satellite constellations.

12. The method according to claim 1, wherein the source node and the destination node are on different sides of the LEO polar satellite constellations.

13. The method according to claim 1, wherein finding the Manhattan path, based on the shortest path, from the source node to the destination node includes:
- identifying a Manhattan path region from the source node to the destination node, wherein the source node and the destination node are on a same side of the LEO polar satellite constellations, and
- when the source node is located at a row having a highest latitude among rows in the Manhattan path region, routing along inter-plane ISLs in the row having the highest latitude to a column that the destination node is located, and then along intra-plane ISLs in the column to the destination node.

14. The method according to claim 1, wherein finding the Manhattan path, based on the shortest path, from the source node to the destination node includes:
- identifying a Manhattan path region from the source node to the destination node, wherein the source node and the destination node are on different sides of the satellite network, and
- when the source node is not located at a row having a highest latitude among rows in the Manhattan path region, routing along intra-plane ISLs to the row having the highest latitude, then along inter-plane ISLs at the row having the highest latitude to a column of the destination node, and then along intra-plane ISLs to the destination node, wherein the routing passes through Polar regions.

15. The method according to claim 1, wherein finding the Manhattan path, based on the robustness criterion, from the source node to the destination node includes:
- I. setting the source node as a current node, wherein the current node further connects to two possible ISLs for a next hop in the Manhattan path for routing to the destination node;
- II. determining an ISL having a better robustness from the two possible ISLs;
- III. using the ISL having the better robustness for the next hop, wherein the ISL having the better robustness has an ending node;
- IV. determining whether the next hop reaches the destination node; and
- V. setting the ending node of the ISL having the better robustness as the current node and repeating steps I)-V), when the selected next hop does not reach the destination node.

16. The method according to claim 15, wherein determining the ISL having the better robustness from two possible ISLs includes:
- evaluating a column margin Mc(i) and a row margin Mr(i) of each ISL(i) in the two possible ISLs to the destination node;
- determining a robustness score of each ISL(i) in the two possible ISLs as a minimum value of the column margin Mc(i) and row margin Mr(i);
- comparing the robustness scores of the two possible ISLs; and
- determining an ISL having the highest score in the two possible ISLs as the ISL having the better robustness.

17. The method according to claim 16, further including:
- when the two possible ISLs have a same robustness score, selecting an ISL that has an ending node with a higher latitude over an other ISL in the two possible ISLs.

\* \* \* \* \*